United States Patent [19]
Neitzel et al.

[11] Patent Number: 5,400,099
[45] Date of Patent: Mar. 21, 1995

[54] FILM-PROCESSING APPARATUS, IN PARTICULAR FOR X-RAY SHEET FILM

[75] Inventors: Ernst-Albert Neitzel, Stuttgart; Friedrich Ueffinger, Schorndorf-Weiler, both of Germany

[73] Assignee: Eastman Kodak Company, Rochester, N.Y.

[21] Appl. No.: 203,171

[22] Filed: Feb. 28, 1994

[30] Foreign Application Priority Data

Mar. 4, 1993 [DE] Germany ............... 43 06 736.0

[51] Int. Cl.$^6$ .................. G03D 13/06; G03D 17/00
[52] U.S. Cl. .......................... 354/310; 354/312
[58] Field of Search ....................... 354/307–312, 354/331, 333, 336; 414/411

[56] References Cited

U.S. PATENT DOCUMENTS 4,210,816  7/1980  Stievenart et al. ............. 414/411

FOREIGN PATENT DOCUMENTS

3705851A1  9/1988  Germany.

OTHER PUBLICATIONS

"DuPont Daylight Systems" by DuPont.
"Curix Compact Filmcenter" by Agfa-Gevaert.
"Multiloader 300" by Kodak.
"Capacity Plus–Film–Center" by Agfa.

*Primary Examiner*—D. Rutledge
*Attorney, Agent, or Firm*—William F. Noval

[57] ABSTRACT

The invention relates to a film-processing apparatus, in particular for X-ray sheet film, with a first feeding device arranged in a daylight environment and serving for transporting film cassettes to a film loading and unloading station, a second feeding device arranged in a darkroom environment and serving for transporting exposed film, and with a transport device for moving the film sheets to a film-processing station, said apparatus being designed such that film can be fed to the film-processing station in a simple manner either in a daylight environment, in a darkroom environment or in both environments without the apparatus having to be modified in a complicated way. For this purpose, the apparatus comprises sealing means which connect the second feeding device with the darkroom in a light-tight manner and are releasably attachable by adhesive means, and the second feeding device can be closed in light-tight manner by means of a lid pivotally mounted on a housing of the film-processing apparatus.

5 Claims, 2 Drawing Sheets

FILM-PROCESSING APPARATUS, IN PARTICULAR FOR X-RAY SHEET FILM

BACKGROUND OF THE INVENTION

The invention relates to a film-processing apparatus, in particular for X-ray sheet film, with a first feeding device arranged in a daylight environment and serving for transporting film cassettes to a film loading and unloading station, a second feeding device arranged in a darkroom environment and serving for transporting exposed film, and with a transport device for moving the film sheets to a film-processing station.

Apparatus for daylight handling of X-ray film loaded in cassettes are known e.g. from prospectuses of the firm of DuPont, said prospectuses describing a cassette-handling system. A "Curix Compact Filmcenter" made by Agfa-Gevaert and a "Multiloader 300" made by Kodak are also known. These apparatus allow film loaded in cassettes to be fed to a film-processing unit via a loading and unloading station.

The known apparatus are disadvantageous in that only such films can be transported to the processing unit which have dimensions corresponding to the cassette formats. Larger film sizes cannot be fed to such a processing unit. On the one hand, this requires a separate processing unit and on the other hand, loading of a cassette with the above dimensions is technically complicated and cannot be realized in an economical manner. To avoid such disadvantages a modified "Capacity Plus-Film-center" of Agfa is known which comprises a feeding device for transporting exposed films in a darkroom environment. However, an apparatus of this type is disadvantageous in that an installed feeding unit requires complicated and extensive modifications in order that the film center be operated in daylight and be thus independent of a darkroom.

SUMMARY OF THE INVENTION

It is the object of the invention to design an apparatus of the generic type such that by simple means film can be fed to the processing unit in a daylight environment, in a darkroom environment or in both environments without the apparatus having to be modified in a complicated manner.

According to the invention, this problem is solved in that for connecting the second feeding device with the darkroom in a light-tight manner, sealing means are releasably attachable by adhesive means which allow the processing unit to be removed from the darkroom quickly and easily.

A lid pivotally mounted on the housing serves for sealing said feeding device in a light-tight manner, and a film-guiding element hinged inside the housing serves for centrally transporting the film to a pair of transport rollers of the transport device. This feature is advantageous in that only one film transport device is necessary for transporting the sheet film to the processing unit either directly or with the film loaded in a cassette. Cassettes which cannot be unloaded in the loading and unloading station can be unloaded in the darkroom and transported to the second feeding device without complicated measures having to be taken.

In a further modification of the invention, electromagnetic locking elements lock the lid to the housing of the apparatus such that when the lid is in its released and open position, transport rollers arranged in the first feeding device are blocked. Film cassettes loaded via this device are thus not transported to the loading and unloading station. When the lid is in its blocked and closed position, the transport rollers of the first feeding device are released with the driving motor of the transport device being adapted to be switched on by means of a switch arranged in the feed-in path.

Advantageously, two film transport rollers arranged in the film-processing unit are designed as actuating rollers which switch off the driving motor so that a renewed feeding of the film either directly or with the film loaded in a cassette can take place only if the film is engaged by the film processing station. Operating errors of the apparatus are thus excluded.

DESCRIPTION OF THE PREFERRED EMBODIMENTS

The film-processing apparatus according to the invention relates to the design of an X-ray film cassette loading and unloading unit such as known from DE-37 05 851-A1.

Figure 1:
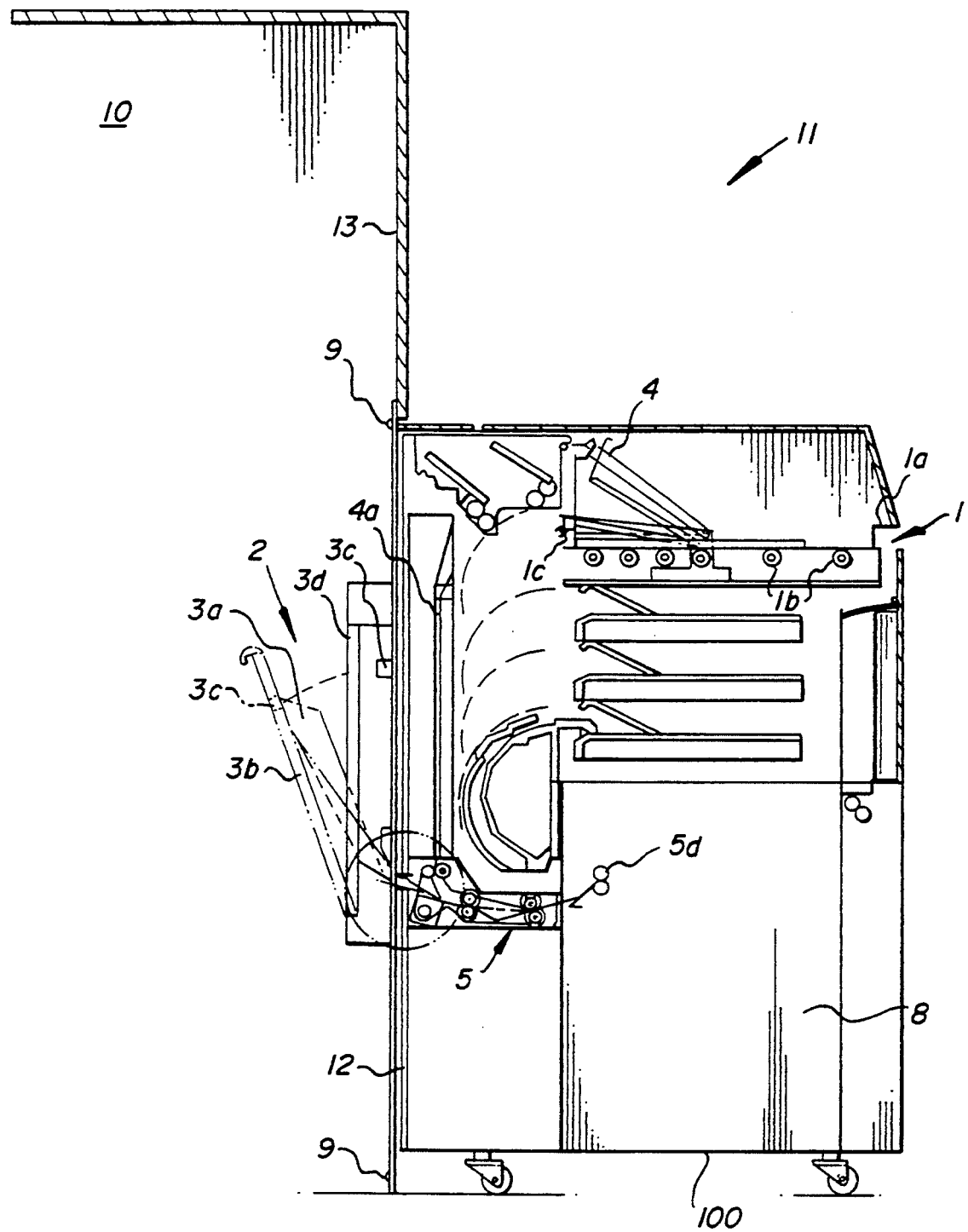
FIG. 1 is a sectional view of the film-processing apparatus according to the invention.
Figure 2:
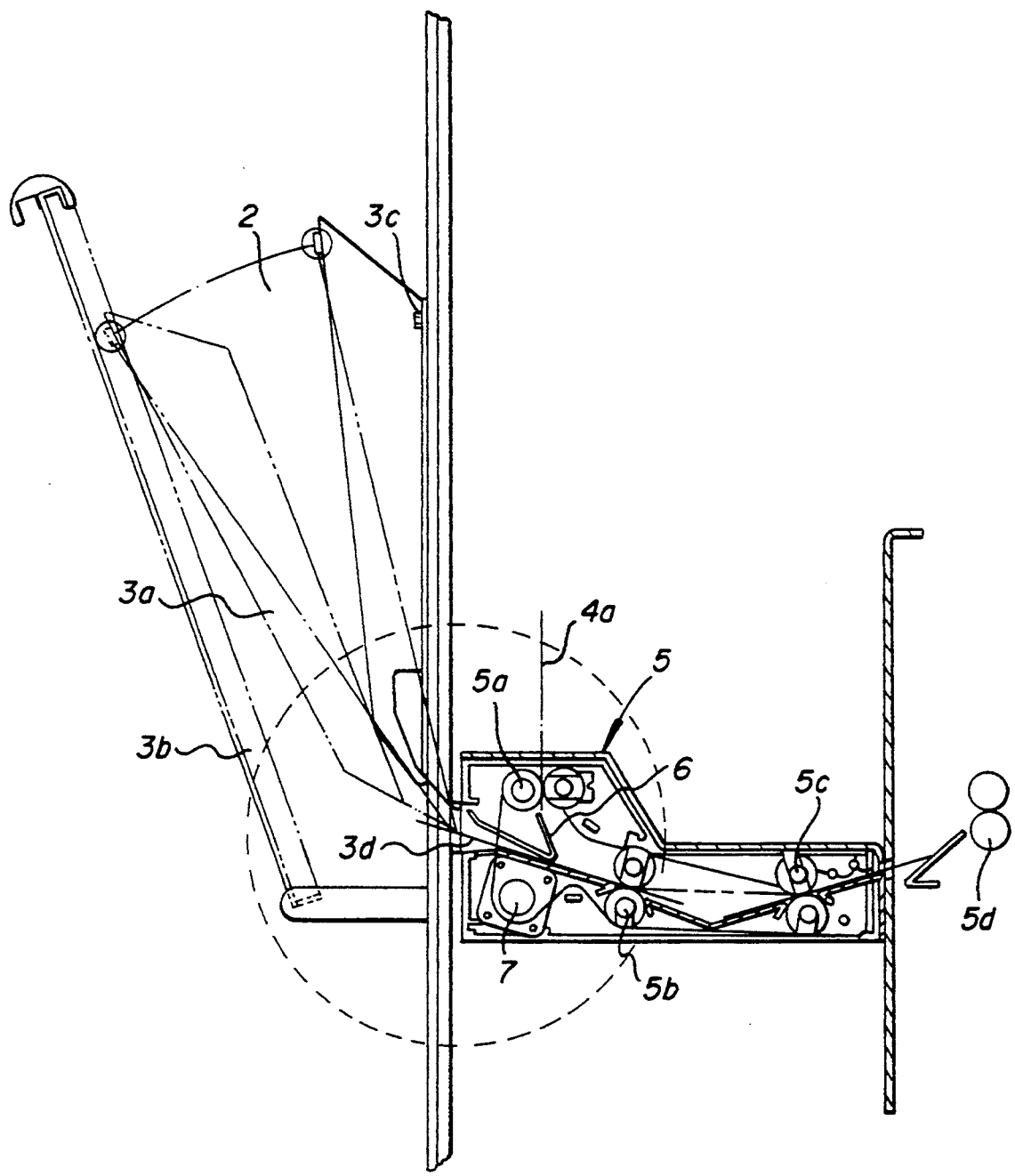
FIG. 2 is an enlarged view of the feeding and transport device according to FIG. 1.

As can be seen from FIG. 1, a cassette (not illustrated) loaded with exposed film can be inserted in a known manner into a loading aperture 1a of a first feeding device 1. In the cassette transport path, several transport rollers 1b, an actuating member 1c designed as a switch, and a loading and unloading station 4 are provided from which the film is fed along the transport path 4a to the film transport path of the feeding device 2 according to the invention.

The feeding device 2 is formed by a lid 3b which is pivotally mounted on the wall 12 of the housing and which can be locked in a light-tight manner by means of electromagnetic locking elements 3c, and by a film-guiding element 3a which is hinged to the transport device 5 and allows the film to be centrally supplied thereto. For this purpose, the sides of the film-guiding element 3a are bevelled and the loading aperture has a trapezoidal shape. In order to avoid that the film sticks to the film-guiding element 3a, the surface of said element has a texture not illustrated. The lid 3b is sealed by a sealing element extending around the wall 12 of the housing.

The feeding device 2 is connected to the darkroom 10 defined by wall 13 in a light-tight manner by a frame with resilient sealing elements 9, said frame being arranged between the upper and the lower portions of rear wall 12 of the housing and wall 13. At the points where the sealing elements 9 are connected with the frame and at the wall 12 of the housing, said elements 9 are provided with adhesive sealings so that the film-processing apparatus 100 can be easily removed from the darkroom 10 with the lid 3b closed and can be operated separately in a daylight environment 11 as a daylight apparatus of a type known.

For transporting the films inserted via the feeding device 1 and the feeding device 2, the transport device 5 comprises a stationary path-guiding member 6 for joining the transport paths 3d and 4a. Several pairs of transport rollers 5a to 5c which are arranged in the transport device 5 and are jointly driven by a motor 7 via a toothed belt feed inserted films to a pair of transport rollers 5d of the film-processing station 8, which rollers are designed as actuating rollers.

In the housing of the apparatus, display panels not illustrated are provided in the daylight environment 11 and in the darkroom 10, said panels indicating the actual operating condition of the apparatus, e.g. whether a film loaded by the feeding device 2 is being processed or whether the lid 3b is locked.

The device has the following mode of operation:

In the basic condition, the lid 3b of the feeding device 2 is closed.

When a film cassette is loaded through the loading aperture 1a of feeding device 1, the cassette is moved by transport rollers 1b into the cassette loading and unloading station 4. During this operation, the cassette actuates switch 1c whereupon a signal is produced which is supplied to a central control unit causing the lid 3b to be blocked by the electromagnetic locking elements 3c and the driving motor 7 of the transport device 5 to be started. Loading and unloading of the cassette takes place as described in DE-37 05 851-A1. The film thus unloaded from the cassette drops onto the transport path 4a and onto the first pair of transport rollers 5a of transport device 5 and is guided by said pair of transport rollers via the stationary path-guiding member 6 to the pairs of transport rollers 5b and 5c. When the trailing edge of the film reaches the pair of actuating rollers 5d of the film-processing station 8, the central control unit stops motor 7, whereupon the pair of transport rollers 5d and other transport means arranged in the processing apparatus continue transporting the film. At the same time, the lid 3b is released again and the actual operating condition of the apparatus is indicated by the display panels in the daylight environment 11 and in the darkroom 10. A new cassette can now be loaded via feeding device 1.

When a film is loaded by the film-guiding element 3a with the lid 3b open, the locking elements 3c which are also open produce a signal causing the central control unit to block the drive of the transport rollers 1b of feeding device 1 and to start the driving motor 7 of transport device 5. Gravity and the guiding operation of the user, respectively, cause the loaded film to slide along the transport path 3d to the pair of transport rollers 5b which move the film from the pair of rollers 5c to the film-processing station 8. When, as described above, the trailing edge of the film reaches the pair of transport rollers 5d of the film-processing station 8, the central control unit stops the driving motor 7 and further film transport is effected by the pair of rollers 5d and by other transport means arranged in the processing station 8. When no other films are transported to the feeding device 2, the lid 3b is closed and the transport rollers 1b of feeding device 1 are thus unblocked so that new film cassettes can now be fed to feeding device 1.

Although the invention has been described in detail with particular reference to a preferred embodiment thereof, it will be understood that variations and modifications can be effected within the spirit and scope of the invention as described above and as defined in the appended claims.

What is claimed is:

1. A film-processing apparatus, including a first feeding device arranged in a daylight environment and serving for transporting film cassettes to a film loading and unloading station, a second feeding device arranged in a darkroom environment and serving for transporting film not loaded in a cassette, and having a transport device for moving the film sheets to a film-processing station, the improvement comprising:

a seal releasably attachable by adhesive means, for connecting the second feeding device with the darkroom in a light-tight manner, and a lid, pivotally mounted on a housing of the film-processing apparatus, for closing the second feeding device in a light-tight manner.

2. Film-processing apparatus according to claim 1, wherein said lid can be locked with the housing by electromagnetic locking elements such that transport rollers arranged in the first feeding device are blocked when the lid is in its released and open position and the driving motor of the transport device can be switched on, and that the transport rollers of the first feeding device are released when the lid is in its blocked and closed position and the driving motor of the transport device can be switched on by an actuating member arranged in the feeding path of the device.

3. Film-processing apparatus according to claim 1, wherein said second feeding device includes a film-guiding element which is hinged to the transport device and serves for centrally guiding the film to a pair of transport rollers of the transport device.

4. Film-processing apparatus according to claim 1, wherein a pair of film transport rollers arranged in the film-processing station is designed as an actuating roller for switching off the driving motor.

5. Film-processing apparatus according to claim 1, wherein a stationary path guiding element is arranged in the transport device for joining the film transport paths of the first and the second feeding device.

* * * * *